US012776446B2

(12) United States Patent
Sakamoto et al.

(10) Patent No.: US 12,776,446 B2
(45) Date of Patent: Oct. 27, 2026

(54) METHOD FOR MANUFACTURING ELECTRONIC COMPONENT WITH COIL

(71) Applicant: SUMIDA CORPORATION, Tokyo (JP)

(72) Inventors: Shinichi Sakamoto, Tokyo (JP); Douglas James Malcolm, Kingston (CA)

(73) Assignee: SUMIDA CORPORATION (JP)

( * ) Notice: Subject to any disclaimer, the term of this patent is extended or adjusted under 35 U.S.C. 154(b) by 0 days.

(21) Appl. No.: 18/301,604

(22) Filed: Apr. 17, 2023

(65) Prior Publication Data

US 2023/0253151 A1 Aug. 10, 2023

Related U.S. Application Data

(60) Division of application No. 17/483,852, filed on Sep. 24, 2021, now Pat. No. 11,657,962, which is a (Continued)

(51) Int. Cl.
*H01F 7/06* (2006.01)
*H01F 17/04* (2006.01)
(Continued)

(52) U.S. Cl.
CPC ........... *H01F 41/064* (2016.01); *H01F 17/04* (2013.01); *H01F 27/022* (2013.01); *H01F 27/24* (2013.01);
(Continued)

(58) Field of Classification Search
CPC .. H01F 41/0206; H01F 41/0246; H01F 41/04; H01F 27/24; H01F 27/2823; H01F 17/04; H01F 2017/048
See application file for complete search history.

(56) References Cited

U.S. PATENT DOCUMENTS 3,255,512 A 6/1966 Lochner
3,655,971 A 4/1972 Haas et al.
(Continued)

FOREIGN PATENT DOCUMENTS

CN 101441929 A 5/2009
CN 101697309 A 4/2010
(Continued)

OTHER PUBLICATIONS

Chinese Office Action for Application No. CN201410050474.7 dated Feb. 25, 2016 (24 pages).
(Continued)

*Primary Examiner* — Paul D Kim
(74) *Attorney, Agent, or Firm* — Harness, Dickey & Pierce, P.L.C.

(57) ABSTRACT

An inductor includes an air-core coil assembled with a T-shaped core and a composite magnetic material and resin mixture embedding the T-shaped core and the air-core coil. The air-core coil has: a coil member having a coil axis and first and second sides opposite to each other; and first and second leads that are integrally connected to the coil member. The first and second leads respectively have: first and second bent members at the first side; first and second ends at the second side; and first and second bottom extensions respectively connected between the first and second bent members and the first and second ends. The first and second bent members extend in a first direction parallel to the coil axis, the first and second ends extend in a second direction parallel to the coil axis, and the first and second bottom extensions extend perpendicular to the coil axis.

10 Claims, 11 Drawing Sheets

Related U.S. Application Data continuation of application No. 16/991,131, filed on Aug. 12, 2020, now Pat. No. 11,158,454, which is a continuation of application No. 16/698,609, filed on Nov. 27, 2019, now Pat. No. 10,777,352, which is a continuation of application No. 16/545,618, filed on Aug. 20, 2019, now Pat. No. 10,529,485, which is a division of application No. 16/385,603, filed on Apr. 16, 2019, now Pat. No. 10,431,378, which is a continuation of application No. 15/726,616, filed on Oct. 6, 2017, now Pat. No. 10,304,624, which is a division of application No. 14/734,004, filed on Jun. 9, 2015, now Pat. No. 9,818,534, which is a division of application No. 13/804,857, filed on Mar. 14, 2013, now Pat. No. 9,087,634.

(51) Int. Cl.

| | |
|---|---|
| ***H01F 27/02*** | (2006.01) |
| ***H01F 27/24*** | (2006.01) |
| ***H01F 27/255*** | (2006.01) |
| ***H01F 27/28*** | (2006.01) |
| ***H01F 27/29*** | (2006.01) |
| ***H01F 41/02*** | (2006.01) |
| ***H01F 41/064*** | (2016.01) |

(52) U.S. Cl.

CPC ....... *H01F 27/255* (2013.01); *H01F 27/2828* (2013.01); *H01F 27/29* (2013.01); *H01F 41/02* (2013.01); *H01F 41/0246* (2013.01); *H01F 2017/048* (2013.01); *Y10T 29/4902* (2015.01); *Y10T 29/49071* (2015.01)

(56) References Cited

U.S. PATENT DOCUMENTS

| | | | | |
|---|---|---|---|---|
| 3,720,738 | A | 3/1973 | Munk | |
| 4,059,376 | A | 11/1977 | Ito et al. | |
| 4,498,067 | A | 2/1985 | Kumokawa et al. | |
| 5,307,041 | A | 4/1994 | Kato et al. | |
| 6,214,921 | B1 * | 4/2001 | Bluett | H01R 13/03 524/495 |
| 6,296,699 | B1 | 10/2001 | Jin | |
| 6,348,850 | B1 | 2/2002 | Kimura et al. | |
| 6,392,525 | B1 | 5/2002 | Kato et al. | |
| 6,710,692 | B2 | 3/2004 | Kato et al. | |
| 6,759,935 | B2 | 7/2004 | Moro et al. | |
| 6,774,755 | B2 | 8/2004 | Nakata et al. | |
| 6,888,435 | B2 | 5/2005 | Inoue et al. | |
| 6,922,130 | B2 | 7/2005 | Okamoto | |
| 6,938,327 | B2 | 9/2005 | Takayama et al. | |
| RE39,453 | E | 1/2007 | Boytor et al. | |
| 7,219,416 | B2 | 5/2007 | Inoue et al. | |
| 7,277,001 | B2 | 10/2007 | Mizushima et al. | |
| 7,449,984 | B2 | 11/2008 | Kawarai | |
| 7,523,542 | B2 | 4/2009 | Kawarai | |
| 7,612,640 | B2 | 11/2009 | Sano | |
| 7,768,374 | B2 | 8/2010 | Fushimi | |
| 8,295,786 | B2 * | 10/2012 | Aramaki | H01F 1/26 423/616 |
| 8,487,733 | B2 | 7/2013 | Chu et al. | |
| 8,723,629 | B1 | 5/2014 | Liu et al. | |
| 8,730,001 | B2 | 5/2014 | Yoshikawa et al. | |
| 9,136,050 | B2 | 9/2015 | Hsieh et al. | |
| 9,318,251 | B2 | 4/2016 | Klesyk et al. | |
| 9,536,648 | B2 | 1/2017 | Yamaguchi et al. | |
| 9,589,716 | B2 | 3/2017 | Doljack et al. | |
| 9,847,156 | B2 | 12/2017 | Inaba | |
| 10,777,352 | B2 | 9/2020 | Sakamoto et al. | |
| 2001/0001895 | A1 | 5/2001 | Setiabudi et al. | |
| 2001/0016977 | A1 | 8/2001 | Moro et al. | |
| 2002/0097124 | A1 | 7/2002 | Inoue et al. | |
| 2002/0097129 | A1 | 7/2002 | Johnson | |
| 2002/0148995 | A1 | 10/2002 | Yokoyama et al. | |
| 2003/0156000 | A1 | 8/2003 | Brunner | |
| 2003/0163914 | A1 | 9/2003 | Takayama et al. | |
| 2003/0218527 | A1 | 11/2003 | Okamoto | |
| 2005/0003199 | A1 * | 1/2005 | Takaya | C08G 59/4223 428/416 |
| 2005/0156362 | A1 * | 7/2005 | Arnold | H10N 30/852 264/645 |
| 2007/0216512 | A1 | 9/2007 | Sano et al. | |
| 2008/0036566 | A1 | 2/2008 | Klesyk et al. | |
| 2008/0143466 | A1 | 6/2008 | Monma | |
| 2009/0058588 | A1 | 3/2009 | Suzuki et al. | |
| 2009/0231078 | A1 | 9/2009 | Watanabe | |
| 2010/0013587 | A1 | 1/2010 | Yan et al. | |
| 2010/0155648 | A1 * | 6/2010 | Saito | H01F 1/37 252/62.53 |
| 2011/0005064 | A1 | 1/2011 | Klesyk et al. | |
| 2011/0006870 | A1 | 1/2011 | Sakamoto | |
| 2013/0027161 | A1 | 1/2013 | Urano | |
| 2013/0194060 | A1 * | 8/2013 | Nakada | H01F 17/045 336/192 |
| 2013/0200970 | A1 * | 8/2013 | Ogawa | H01F 1/22 336/83 |
| 2014/0002227 | A1 | 1/2014 | Hsieh et al. | |
| 2014/0097921 | A1 | 4/2014 | Ohtsubo et al. | |
| 2016/0141087 | A1 * | 5/2016 | Liu | H01F 1/14741 336/83 |

FOREIGN PATENT DOCUMENTS

| | | | |
|---|---|---|---|
| CN | 201689758 | U | 12/2010 |
| CN | 201717078 | U | 1/2011 |
| EP | 1818954 | A1 | 8/2007 |
| JP | 2001-060523 | A | 3/2001 |
| JP | 2002-289442 | A | 10/2002 |
| JP | 2002-334807 | A | 11/2002 |
| JP | 2003-243228 | A | 8/2003 |
| JP | 2005-175158 | A | 6/2005 |
| JP | 2006-041173 | A | 2/2006 |
| WO | 2009-028247 | A1 | 3/2009 |

OTHER PUBLICATIONS

Extended European Search Report for EP Application No. 141600007, dated Oct. 26, 2017; 11 pages.

* cited by examiner

METHOD FOR MANUFACTURING ELECTRONIC COMPONENT WITH COIL

CROSS-REFERENCE TO RELATED APPLICATIONS

This application is a divisional application of U.S. patent application Ser. No. 17/483,852, filed on Sep. 24, 2021, which is a continuation application of U.S. patent application Ser. No. 16/991,131, filed on Aug. 12, 2020, now U.S. Pat. No. 11,158,454, issued on Oct. 26, 2021, which is a continuation application of U.S. patent application Ser. No. 16/698,609, filed on Nov. 27, 2019, now U.S. Pat. No. 10,777,352, issued on Sep. 15, 2020, which is a continuation application of U.S. patent application Ser. No. 16/545,618, filed on Aug. 20, 2019, now U.S. Pat. No. 10,529,485, issued on Jan. 7, 2020, which is a divisional application of U.S. patent application Ser. No. 16/385,603, filed on Apr. 16, 2019, now U.S. Pat. No. 10,431,378, issued on Oct. 1, 2019, which is a continuation application of U.S. patent application Ser. No. 15/726,616, filed on Oct. 6, 2017, now U.S. Pat. No. 10,304,624, issued on May 28, 2019, which is a divisional application of U.S. patent application Ser. No. 14/734,004, filed on Jun. 9, 2015, now U.S. Pat. No. 9,818,534, issued on Nov. 14, 2017, which is a divisional application of U.S. patent application Ser. No. 13/804,857, filed on Mar. 14, 2013, now U.S. Pat. No. 9,087,634, issued on Jul. 21, 2015.

BACKGROUND

The present invention relates to a method for manufacturing an electronic component that has a coil. Specifically, the electronic component may be a power supply module or a coil component, such as an inductor element.

In the field of electronic components, it is well known to manufacture a coil component having a dust core by a press machine. According to this method, the press machine presses a mixture of magnetic power and resin to seal a coil therewithin. This produces what is commonly referred to as a sealed coil-type magnetic component. Japanese Patent Publication Number JP 2007-81306 discloses a sealed coil-type magnetic component. The sealed coil-type magnetic component is configured with an air-core coil and a magnetic body. The magnetic body is made of a magnetic powder and resin mixture which seals the air-core coil. After the mixture is put in a metal mold of a press machine, the air-core coil is placed on the mixture. Thereafter, additional mixture is added over the air-core coil until the metal mold is filled. Next, upper and lower punches of the press machine press the mixture in the metal mold with a pressure of about 10 ton/cm$^2$.

Unfortunately, because the sealed coil-type magnetic component is formed under high pressure, the air-core coil may be deformed or broken. As such, the manufacturing yield decreases.

In the field of electronic components, it is also well known to manufacture a power supply module by injecting a thermosetting or thermoplastic resin. Such a power supply module is often configured with passive components such as a coil, a resistor and a capacitor, and an IC that are assembled on a circuit board. Japanese Utility Model Publication Number JPU H05-38994 discloses a method of manufacturing one such power supply module. According to the disclosed method, after an electronic component is assembled on a metal board, thermoplastic resin is injected on and around the electronic component. Then, the thermoplastic resin is hardened. However, because the magnetic permeability of the thermoplastic resin is quite low, an electromagnetic wave generated at the electric component (i.e., the coil) is transferred to other areas inside the power supply device but outside the power supply module. Therefore, electromagnetic interference may occur.

SUMMARY

In view of the above, an object of the present invention is to provide a method for manufacturing an electronic component, such as a power supply module, a coil component and an inductor element, with a high yield in which electromagnetic interference does not occur.

To address the above problems, a method for manufacturing an electronic component according to an aspect of the present invention includes placing a T-shaped core and an air-core coil in a mold, injecting a mixture of a composite magnetic material and a resin into the mold so that the T-shaped core and the air-core coil are embedded by the mixture, heating the mixture at a first temperature, adjusting an outer shape while removing excessive mixture, and hardening the mixture.

In the method for manufacturing an electronic component according to another aspect of the present invention, the method further includes applying a pressure of 0.1 to 20.0 kg/cm$^2$ to the mixture for adjusting an outer shape of the mixture by a movable punch of a press machine before the hardening process.

In the method for manufacturing an electronic component according to another aspect of the present invention, the method further includes removing excessive mixture from a top surface of the mixture by a sharp edge of a remover before the heating is performed.

In the method for manufacturing an electronic component according to another aspect of the present invention, the sharp edge of the remover slides along the top surface of the mixture with an angle of 0 to 80 degrees with respect to the top surface and with applying a pressure of 0.1 to 20.0 kg/cm$^2$ to the mixture.

In the method for manufacturing an electronic component according to yet another aspect of the present invention, the injecting process is performed by a dispenser that includes a discharge opening that discharges the mixture, a material tank that stores the mixture, a flow passage through which the mixture flows, a valve that is provided in the flow passage and controls a flow of the mixture, a valve driving unit that opens and closes the valve, and a mixer that is provided at a trailing end of the flow passage and that mixes the mixture, and supplies the mixture toward the discharge opening.

An effect of the present invention is to provide a method for manufacturing an electronic component in which electromagnetic interference does not occur by using a fairly easy and simple manufacturing process with a high yield. The electromagnetic interference against other components assembled on a printed circuit board on which a coil is assembled is reduced by a composite magnetic material in a mixture. In addition, because the fairly easy and simple manufacturing process can be used, the manufacturing cost can be significantly reduced. Further, because an electronic component with a coil is manufactured by injecting a mixture into a metal mold with a fairly low pressure compared with the pressure from a conventional press machine, there is a very low possibility of breaking passive components or a coil assembled on a printed circuit board (PCB). Thus, deformation and breakage of a coil can be prevented.

DESCRIPTION OF EXEMPLARY EMBODIMENT

First Embodiment

Figure 1:
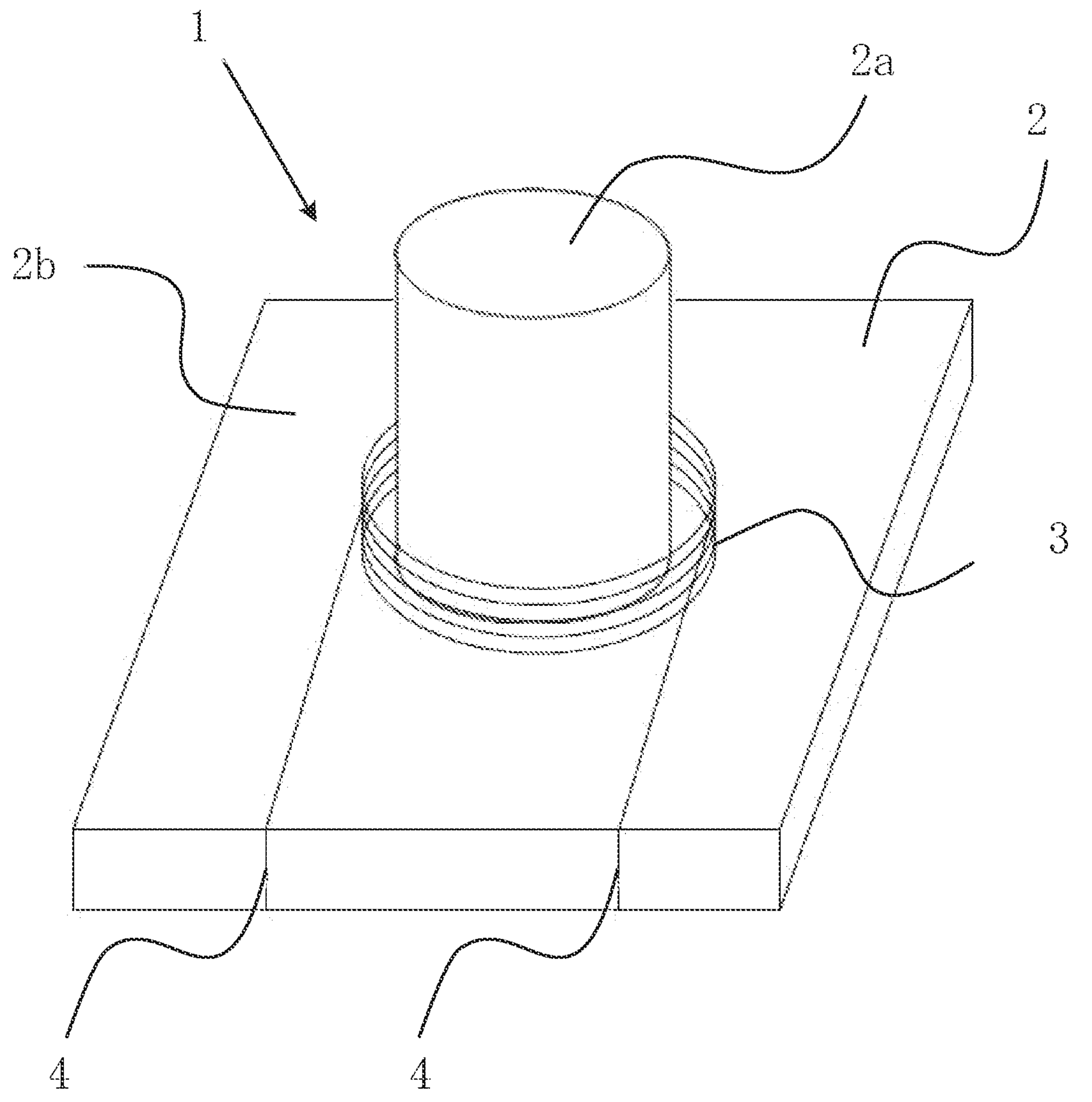
FIG. 1 is a perspective view that shows an inductor element as an intermediate product in a manufacturing process that is configured with a T-shaped core and an air-core coil according to an embodiment of the present invention.
Figure 2:
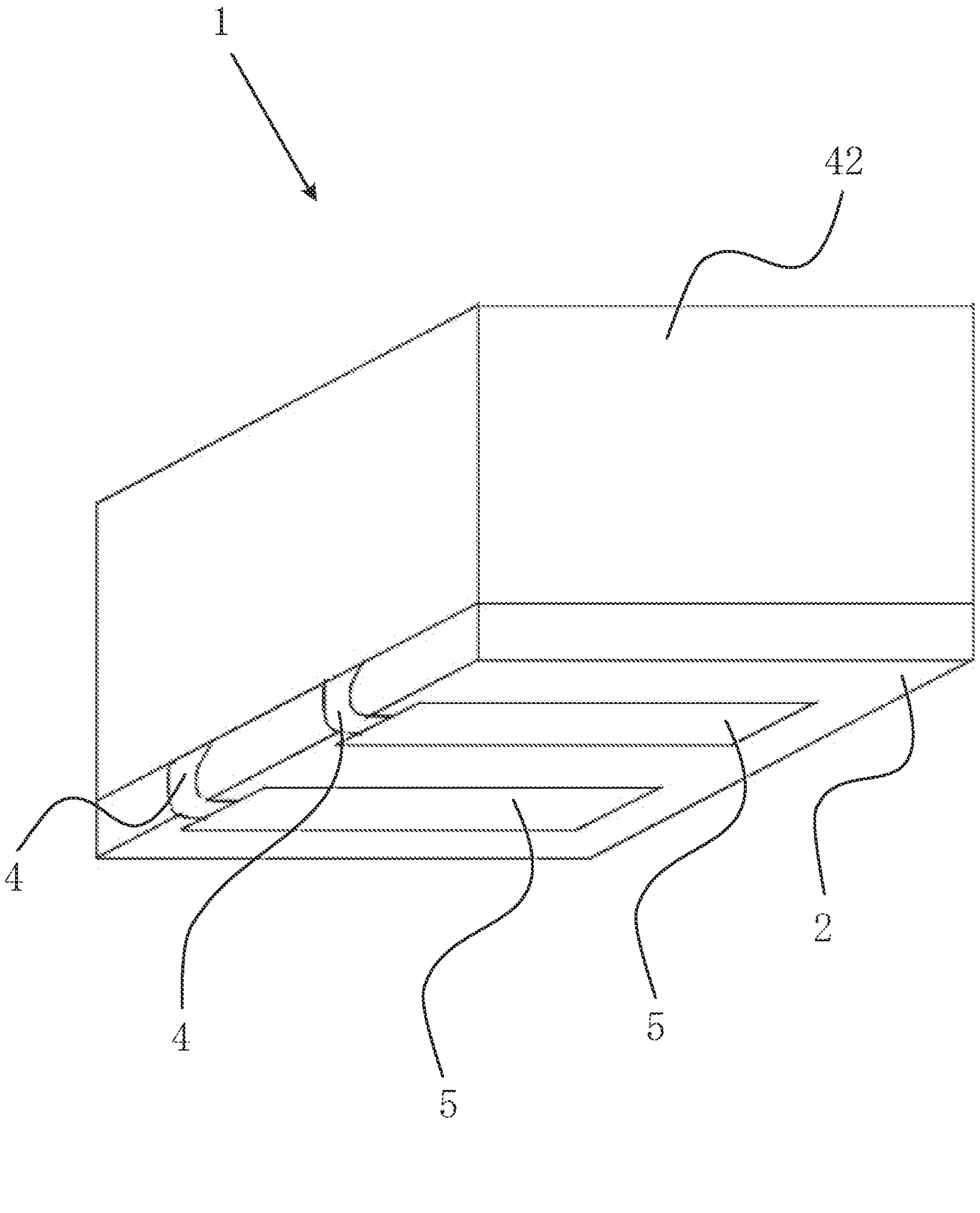
FIG. 2 is a perspective view that shows an inductor element as a final product according to an embodiment of the present invention.

A method for manufacturing an inductor element is explained below with reference to the drawings. FIG. 1 is a perspective view that shows an inductor element 1 as an intermediate product in a manufacturing process that is configured with a T-shaped core 2 and an air-core coil 3. In FIG. 1, the number of illustrated windings is reduced to ease the explanation of the winding condition of conducting wire 4. FIG. 2 is a perspective view that shows the inductor element 1 as a final product. In FIG. 2, the T-shaped core 2 and the air-core coil 3 are sealed by a mixture 42 of a composite magnetic material and a resin. A bottom surface of the T-shaped core 2 is shown in FIG. 2. The T-shaped core 2 is configured with a cylindrical post-shaped core part 2*a* projecting generally perpendicularly from a planar or flat base part 2*b* as shown in FIG. 1. Because the cross section of the T-shaped core 2 is in a T shape, it is referred to as the T-shaped core 2. The size of the inductor element 1 is preferably about 6 mm (width)×9 mm (length)×2.2 mm (height). It is preferred to use a T-shaped core for an inductor element.

Figure 3:
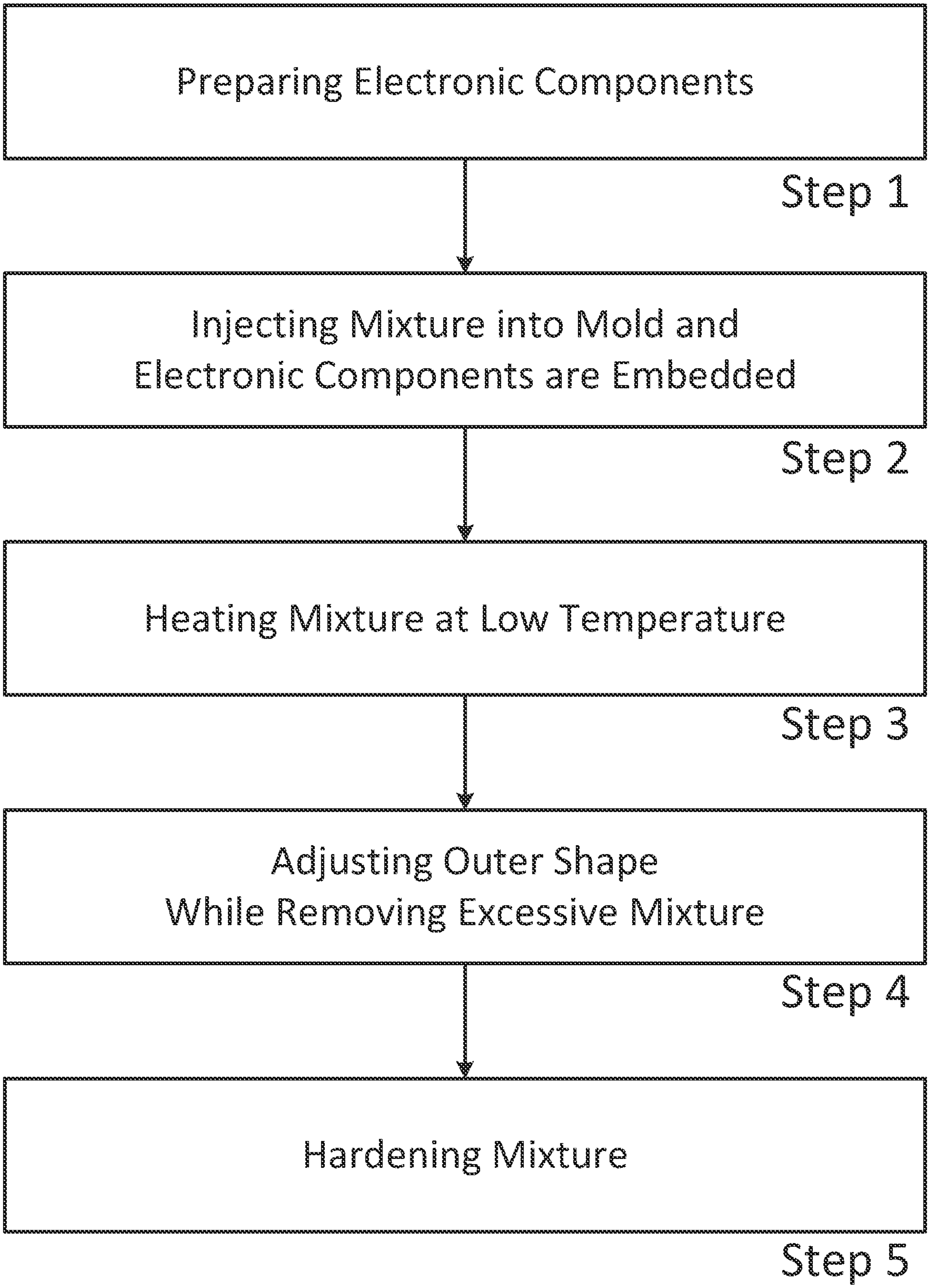
FIG. 3 is a manufacturing flow diagram that shows a manufacturing process for making an electronic component according to an embodiment of the present invention.

FIG. 3 is a flow diagram that shows a manufacturing process for making an electronic component, such as the inductor element 1 or a power supply module. As shown in FIG. 3, the manufacturing process is configured with five consecutive steps. The five steps are as follow: Step 1—preparing the T-shaped core 2 and the air-core coil 3 (electronic components); Step 2—Injecting the mixture into a mold to embed the T-shaped core 2 and the air-core coil 3 (electronic components); Step 3—heating the mixture at a low temperature; Step 4—adjusting an outer shape while removing excessive mixture; and Step 5—hardening the mixture. Thereafter, if desired, a sixth step may be performed: Step 6—polishing an outside the hardened mixture 42. A detailed manufacturing method for the inductor element 1 will be explained below.

Preparing T-Shaped Core and Coil Member

First, as shown in Step 1 in FIG. 3, the T-shaped core 2 and the air-core coil 3 are manufactured separately. An inside diameter of the air-core coil 3 is slightly larger than an outside diameter of the core part 2*a* of the T-shaped core 2.

It is preferred that a material for the T-shaped core 2 has both magnetic and insulation properties. The T-shaped core 2 is preferably made by mixing a magnetic material and an insulation material and by compressing the mixed material with high pressure. Alternatively, the T-shaped core 2 may be made by injecting the mixed material into a metal mold at a high speed after the mixed material is in a molten state by heat. Further alternatively, the T-shaped core 2 is made by sintering a ferrite material. The compressing method will be explained. The magnetic material is preferably metal magnetic powder that has Fe as a main composition and other components, such as Cr, Si and Mn. The insulation material is preferably a resin, for example epoxy resin, glass material, or ceramics. A solvent and/or a mold release agent may also be used. The solvent is preferably one of acetone, toluene, benzene, alcohol or the like. The solvent is evaporated before a mold process is performed. It is preferred that the T-shaped core 3 is made of Fe—Si metal materials.

Next, the metal magnetic powder and the epoxy resin are mixed to form a mixture with a predetermined viscosity. After the mixture is put into a metal mold, a pressure of 2-20 ton/cm$^2$ is applied by upper and lower punches of a press machine. As a result, the T-shaped core 3 is molded. Thereafter, the epoxy resin is heated to harden so that the T-shaped core 3 is completely formed.

The conducting wire is made by a conducting material, such as copper, with an insulating layer thereover. A cross section of the conducting layer 4 can be, for example, a round shape or a flat rectangular shape. The air-core coil 3 is formed by winding the conducting wire 4 with 0.5 to several turns. As discussed above, an inside diameter of the air-core coil 3 is larger than an outside diameter of the core part 2*a* of the T-shaped core 2. Specifically, a difference of the diameters is larger than a distance of several times a maximum particle in the mixture. Such a difference of the diameters is desired for fitting the air-core coil 3 over the core part 2*a* of the T-shaped core 2. In addition, the difference of the diameters is desired for filling the mixture between the core part 2*a* and the air-core coil 3. If the mixture is not filled between the core part 2*a* and the air-core coil 3, cavities may remain in that portion. The cavities may cause a crack in the mixtures sealed in the inductor element 1 and may exhibit a poor magnetic property.

The insulating layers at both ends of the end wires of the conducting wire 4 are removed. When the end wires are dipped in solder for a short period of time, the insulating layer at the ends of the wires are melted and removed by the heat of the solder. At the same time, the solder adheres to the ends of the wires.

Next, the air-core coil 3 is assembled with the T-shaped core 2 as shown in FIG. 1. After solder is applied at both ends of the end wires of the conducting wire 4, the air-core coil 3 is placed on an upper surface of the flat base part 2*b* of the T-shaped core 2 as shown in FIG. 1. The end wires are bent at a side of the T-shaped core 2 to extend to a bottom surface of the flat base part 2*b* of the T-shaped core 2. After both ends of the conducting wire 4 are flattened, flattened ends 5 are fixed on the bottom surface of the T-shaped core 2 as shown in FIG. 2. Note that for the ease of understanding, a width of the illustrated conducting wire 4 is widened further in FIG. 2 than in FIG. 1.

Preparing Mixture

It is preferred that a mixture is prepared at nearly the same time as preparing the T-shaped core 2 and the air-core coil 3. It is preferred that the mixture is made of magnetic and insulation materials as the T-shaped core 2. Specifically, the magnetic material is preferably a Fe—Si alloy. The Fe—Si alloy generally contains 3-97 wt % of silicon and 3-97 wt % of Fe. Another metal, such as Cr, can be added. Fe—Si—Cr alloy is preferred as the metal magnetic material. More preferably, the metal magnetic material is Fe4Si4Cr. The insulation material can be preferably a thermoplastic resin or a thermosetting resin, for example a silicone resin. Any resin that has a heat resistance property that is tolerant of the heat at the time of assembling and packaging the electronic component may be used. It is preferred that the insulation material is an epoxy resin. The mixture is formed by mixing the metal magnetic material and the insulation material. Therefore, the mixture may be referred to as metal paste. A mixing ratio of the Fe—Si—Cr alloy and the epoxy resin is between 3 wt %:97 wt % and 97 wt %:3 wt %. It is preferred that the ratio of the Fe—Si—Cr alloy and the epoxy resin is 95 wt %:5 wt %. If an amount of the Fe—Si—Cr alloy exceeds 97 wt %, the final material strength is inferior. If an amount of the Fe—Si—Cr alloy decrease 3 wt %, the magnetic characteristics is inferior. The viscosity of the mixture is 1,000 to 1,000,000 mPa·s at room temperature, i.e., this is similar to soldering paste or honey (which should be easy for one skilled in the art to understand). A solvent can be used to adjust viscosity.

Injecting Mixture into Mold

Figure 4:
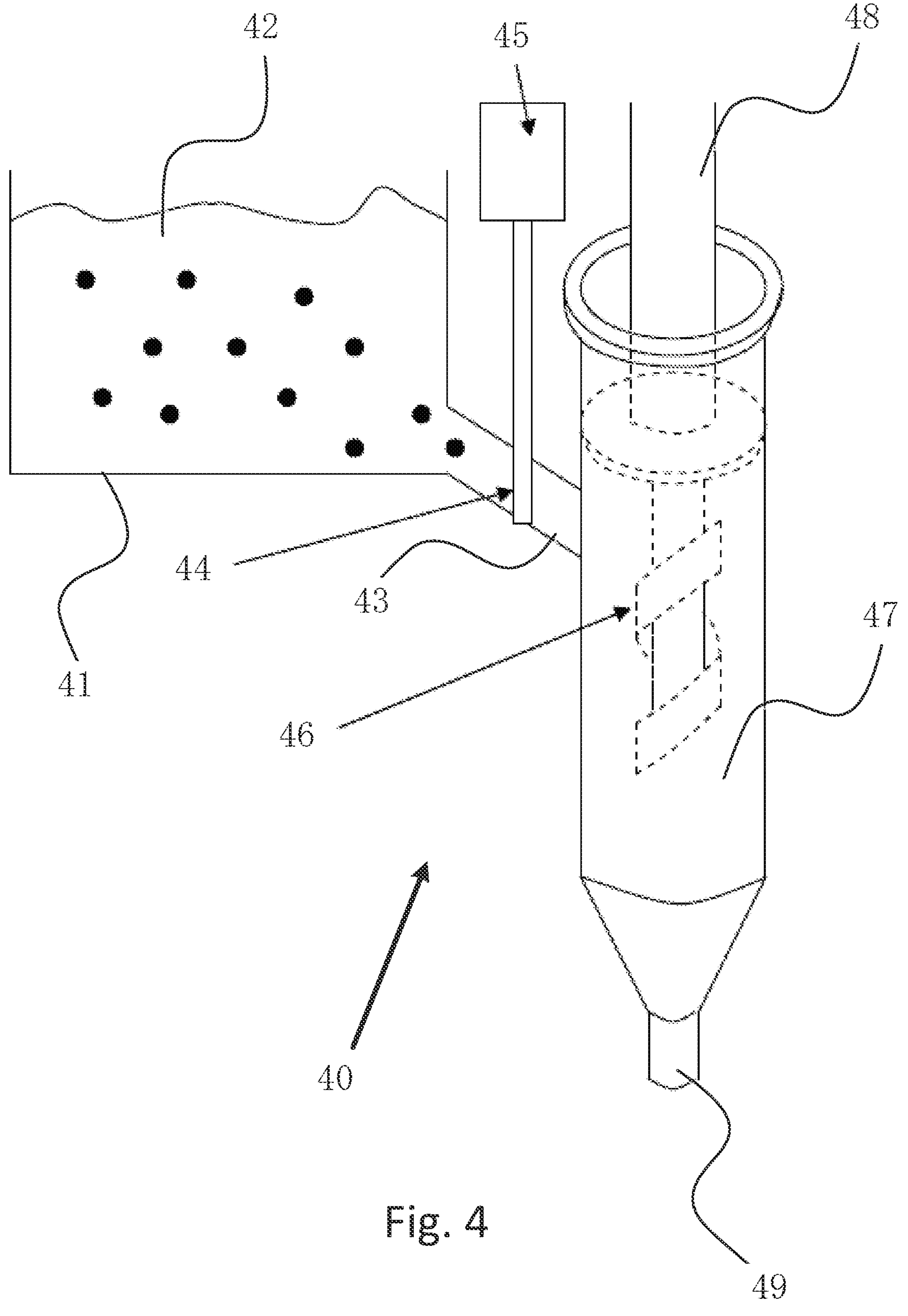
FIG. 4 is a schematic view that shows a dispenser that supplies a mixture into a metal mold to embed an electronic component according to an embodiment of the present invention.
Figure 5:
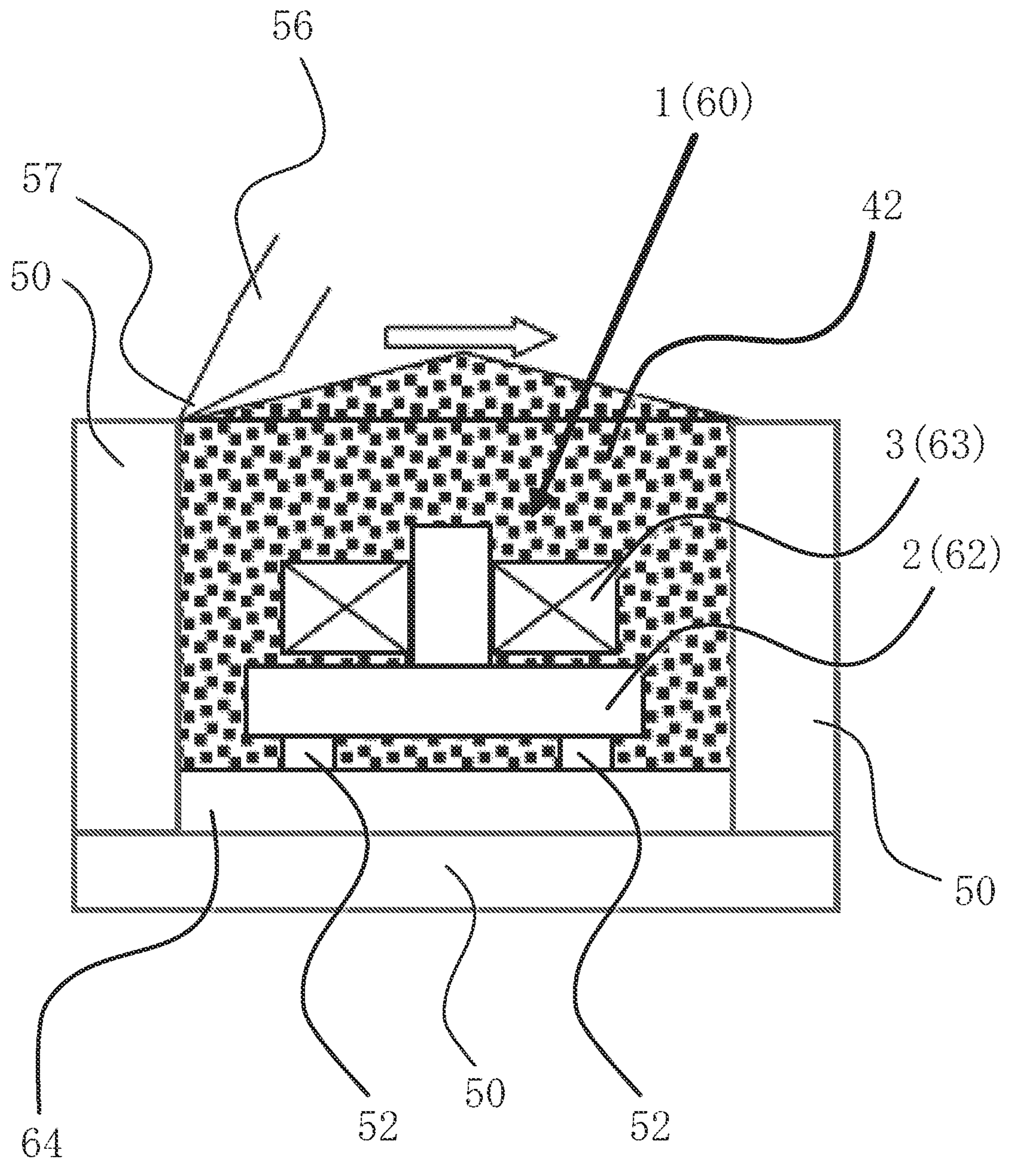
FIG. 5 is a schematic view that shows a process for removing excessive mixture by a sharp edge of a remover according to an embodiment of the present invention.

FIG. 4 is a schematic view that shows a dispenser 40 that supplies a mixture 42 into a metal mold 50 to embed an inductor element. FIG. 5 is a schematic view that shows a process for removing excessive mixture by a sharp edge 57 of a remover 56.

The dispenser 40 is configured with a material tank 41, a mixture 42, a flow passage 43, a valve 44, a valve driving unit 45, a mixer 46, a cylinder 47, a piston 48 and a discharge opening 49. The mixture 42 that is stored in the material tank 41 flows through the flow passage 43. The valve driving unit 45 controls opening and closing of the valve 44. When the valve 44 is open, the mixture 42 flows toward the cylinder 47. When the valve 44 is closed, the mixture cannot flow toward the cylinder 47. The cylinder 47 has the mixer 46 and the piston 48 that pushes the mixture 42 in the cylinder 47 toward the discharge opening 49. The mixer 46 further mixes the mixture 42 in the cylinder 47. The valve driving unit 45 and the piston are controlled by a control unit (not shown) to adjust the amount of mixture discharged into a mold. It is preferred that an area of the discharge opening 40 is wider than an opening of a mold to improve productivity.

In FIG. 5, a PCB 64, electrodes 52, an air-core coil 3 (63), a T-shaped core 2 (64) are placed in a mold 50. Note that if an inductor element 1 (60), which is configured with the air-core coil 3 (63) and the T-shaped core 2 (64), is only placed in the mold 50, the PCB 64 is not required to assemble to the inductor element 1 (60). Here, the mold 50 can also be made from plastic with enough strength.

As shown in Step 2 in FIG. 3, after the above components are placed in the mold 50, the mixture 42 is injected into the mold 50 from the discharge opening 49 of the dispenser 40 and embeds the above components as shown in FIG. 5. In other words, the entire space in the mold 50 is filled with the mixture 42. At this time, the mixture 42 to be injected preferably has a temperature in a range of 20 to 50 C°, and more preferably 25 C°. Because the volume of the mixture 42 decreases by later processes, the mixture 42 is injected over the opening of the mold 50.

In the above discussions, the mixture 42 is stored in the material tank 41. However, the present invention is not limited to the above disclosure. The material tank 41 preferably stores only the metal magnetic material. The epoxy resin may be added in the cylinder 47 and mixed with the metal magnetic material by the mixer 46.

Heating Mixture at Low Temperature

As shown in Step 3 in FIG. 3, while the above components are placed in the mold 50 as shown in FIG. 5, a low temperature heating process is performed by a heater. The mold 50 having the above components is transferred from the dispenser 40 to a heater (not shown). It is preferred that the low temperature for this heating process is in a range of 60 to 100 C°, and more preferably 80 C°. It is preferred that the process time is in a range of 5 to 120 minutes, and more preferably 60 minutes. The solvent in the mixture is evaporated by the low temperature heating process. The viscosity of the mixture 42 is slightly increased by the low temperature heating process. However, the mixture 42 is not fully hardened.

Since the solvent in the mixture 42 is evaporated, small cavities/spaces may be created in the mixture 42. The small cavities/spaces may cause undesirable influences with respect to the compactness and outer appearance of the inductor element 1. If a big cavity is created in the mixture 42, the magnetic flux around the big cavity is disordered. Further, magnetic saturation tends to occur. These problems can be solved by a subsequent process that is explained later.

A conveyer furnace or an infrared heater can be used for performing the above low temperature heating process. A small heater can be added to the dispenser 40. In this case, it is preferred to add the small heater close to the discharge opening 49. The small heater can evaporate the solvent while a smooth flow of the mixture 42 is maintained prior to the small heater. Because the small heater can evaporate a part of the solvent, the processing time for the low temperature heating process can be shortened. At the same time, productivity can be improved.

Adjusting Outer Shape while Removing Excessive Mixture

As shown in Step 4 in FIG. 3, an outer shape of the mixture 42 is adjusted. In addition, excessive mixture 42 is removed. The mold 50 having the above components is transferred from the heater and processed by the remover 56. The remover 56 may be referred to as a scraper. As shown in FIG. 5, the sharp edge 57 of the remover 56 is slid from the left hand side to the right hand side along a solid line while the above components are still inside the mold 50. The sharp edge 57 of the remover 56 is slid along the top surface of the mixture with a preferable angle of 0 to 80 degrees with respect to a top surface of the mold 50. More preferably, the angle is 15 degrees. In this removing process, a pressure of 0.1 to 20.0 kg/cm$^2$ may be applied to the mixture to reduce or eliminate the cavities/spaces that are formed by the low temperature heating process as discussed above. It is more preferred that the pressure is in a range of 1 to 10 kg/cm$^2$.

However, the present invention is not limited to the above disclosure. The removing process above can be performed separately from the pressure applying process. Before or after the removing process for removing excessive mixture 42, a pressure of 0.1 to 20.0 kg/cm$^2$ is applied to the mixture 42 for adjusting an outer shape of the mixture 42 by a movable punch of a press machine.

Hardening Mixture

As shown in Step 5 in FIG. 3, the mixture 42 is hardened by another heater. The mold 50 having the above components is transferred from the heater for the low temperature heating process to another heater for a high temperature heating process. Alternatively, a two stage heater can be used. The purpose of the high temperature heating process is for hardening the mixture 42 so that it is in a stable state as a final product. It is preferred that the high temperature for this heating process is in a range of 120 to 200 C°, and more preferably 150 C°. It is preferred that the process time is in a range of 10 to 90 minutes, and more preferably 30 minutes. In the high temperature heating process, a state of the mixture 42 is changed from a half-dried solid state to a solid state. A conveyer furnace or an infrared heater can be used for performing the above high temperature heating process.

Polishing Outside Hardened Mixture

After the hardened mixture 42, i.e., a hardened inductor element 1, is removed from the mold 50, the hardened inductor element 1 can be placed in, for example, a centrifugal barrel polishing machine (not shown) to perform a polishing process. Flashes or burrs that are formed on an outside of the hardened mixture 42 (inductor element 1) are polished by the centrifugal barrel polishing machine. In the polishing process, lead terminals formed on the outside of the inductor element 1 are also polished by the centrifugal barrel polishing machine to improve electrical connectivity.

As discussed above, the manufacturing steps for manufacturing an inductor element are reduced so that production costs can be decreased. In a conventional inductor element that is manufactured by a high pressure method by using punches of a press machine, upper and lower punches of the press machine press the mixture in the metal mold with a pressure of 3-5 ton/cm$^2$. An inductor element manufactured by such high pressure has the following properties: (used power supply is 1V-20 A); DCR (direct current resistance) is 2.7 mΩ; and CL (W) (copper loss or ohmic loss) is 1.08 W. On the other hand, the inductor element 1 according to the present embodiment has the following properties: (used power supply is 1V-20 A); DCR is 1.8 mΩ; and CL (W) is 0.72 W. Therefore, the inductor element 1 according to the present embodiment has superior properties. The DCR of the inductor element 1 is 33% smaller than the conventional inductor element. The CL (W) is significantly reduced.

Second Embodiment

Figure 6:
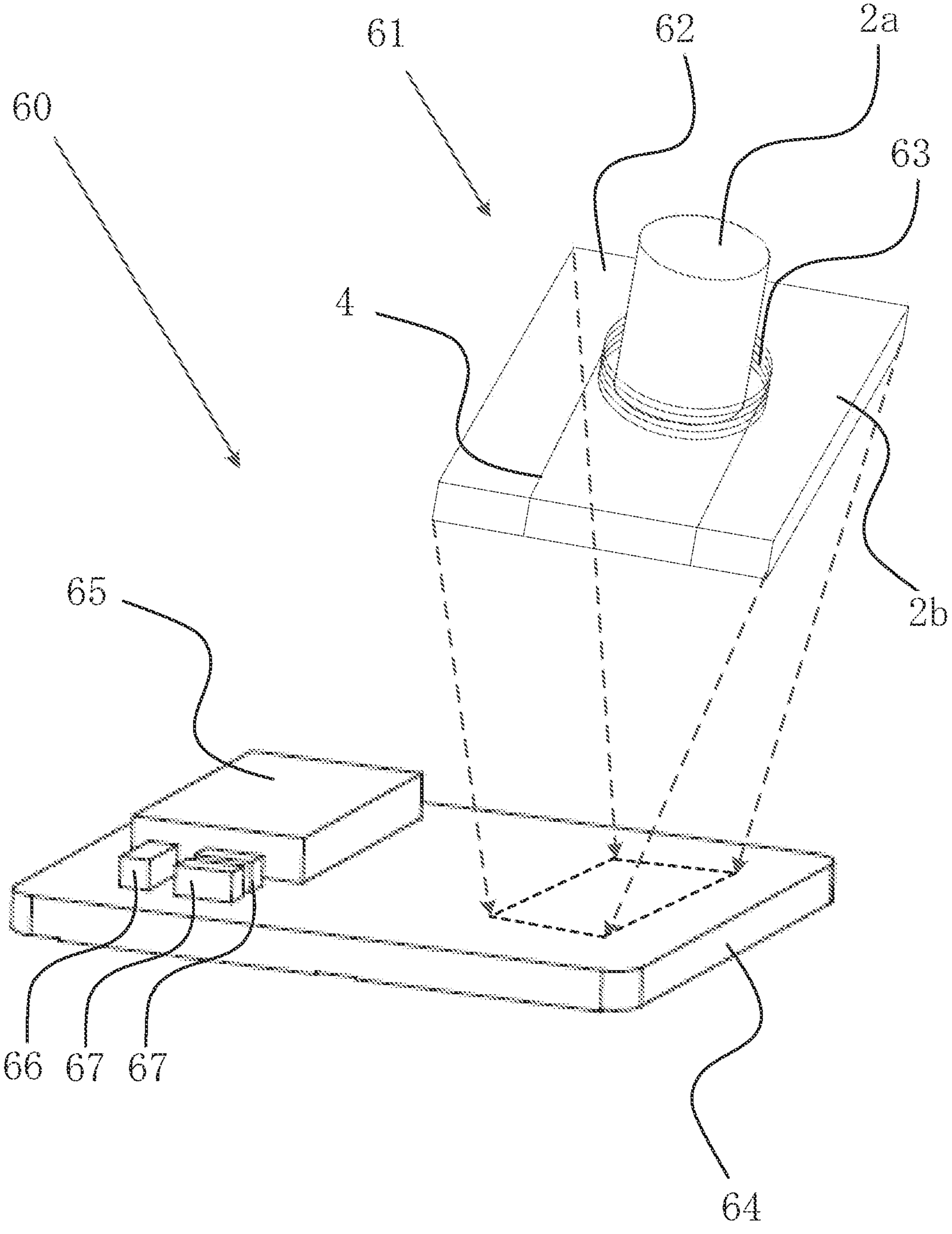
FIG. 6 is a schematic view that shows a power supply module as an intermediate product in a manufacturing process that is configured with an inductor (a T-shaped core and an air-core coil), a printed circuit board (PCB), an integrated circuit (IC), a resistor, and a capacitor according to an embodiment of the present invention.

A method for manufacturing a power supply module is explained below with reference to the drawings. FIG. 6 is a schematic view that shows a power supply module 60 as an intermediate product in a manufacturing process that is configured with an inductor element 61 (a T-shaped core 62 and an air-core coil 63), a printed circuit board (PCB) 64, an integrated circuit (IC) 65, a resistor 66, and a capacitor 67. The inductor element 61 can be made by the same processes for the inductor element 1 that are shown in FIGS. 1 and 2 as explained above. Thus, detailed explanations of manufacturing the inductor element 61 are omitted here. After the inductor element 61 is made, the inductor element 61 is assembled on the PCB 64. At this time, the flattened ends 5 (shown in FIG. 2) are connected to conducting area (not shown), such as terminals or electrodes, provided on the PCB 64. The IC 65, the resistor 66, and the capacitors 67 are assembled on the PCB 64 to form the power supply module 60. The size of the power supply module 60 is preferably about 9 mm (width)×11 mm (length)×2.2 mm (height). It is preferred that a T-shaped core (as mainly explained in the previous and next embodiments) and an I-shaped core are used for a power supply module. An I-shaped core is a cylindrical post-shaped core or a bar-shaped core. If a planar or flat base part of a T-shaped core is removed, a remaining cylindrical post-shaped part can be an I-shaped core. The cross section of an I-shaped core is generally a circle shape or a polygon shape.

A manufacturing process for the power supply module 60 is the same as the inductor element 1 as explained in FIG. 3. As shown in FIG. 3, the manufacturing process is configured with five steps. The five steps are as follow: Step 1—preparing the T-shaped core 62, the air-core coil 63, the PCB 64, the IC 65, the resistor 66, and the capacitor 67 (electronic components); Step 2—Injecting the mixture into a mold to embed the T-shaped core 62, the air-core coil 63, the PCB 64, the IC 65, the resistor 66, and the capacitor 67 (electronic components); Step 3—heating the mixture at a low temperature; Step 4—adjusting an outer shape while removing excessive mixture; and Step 5—hardening the mixture. Further, if desired, a sixth step may be performed: Step 6—polishing an outside the hardened mixture 42. A detailed manufacturing method for the power supply module 60 will be explained below.

Preparing Power Supply Module

First, as shown in FIG. 6 and as shown in Step 1 in FIG. 3, the IC 65 and passive components, such as the resistor 66 and capacitors 67, are assembled on the PCB 64 so as to electrically connect to each other. If the power supply module 60 (with the PCB 64) is assembled to another bigger assembly board (not shown), metal terminals and metal pads should be formed on upper and bottom surfaces of the PCB 64.

It is preferred to form an insulating film (not shown), such as an insulating resin, on the PCB 64, the IC 65, and passive components, such as the resistor 66 and the capacitors 67. The insulating resin is used for the purpose of insulation between the above components and other parts. The insulating resin is also used for absorbing an injecting force of a mixture 42 of a metal magnetic material and a resin in the subsequent process after the power supply module 60 is placed in a mold 50. Therefore, the power supply module 60 is not broken by an injecting process of the mixture 42. Further, the insulating resin is used for fixing the T-shaped core 62 to (terminals or pads of) the PCB 64. When the insulating resin is formed on the PCB 64 and the above described components, the insulating resin is not formed on predetermined areas. Terminals or pads of the PCB 64 are located in predetermined areas to electrically connect to the flattened ends 5, which are formed on the bottom surface of the T-shaped core 62 (see FIG. 2), of the air-core coil 62.

As discussed above, the T-shaped core 62 and the air-core coil 63 are manufactured in the same manner as explained above. Thus, their manufacturing explanations are omitted here. After the T-shaped core 62 and the air-core coil 63 are formed, the T-shaped core 62 and the air-core coil 63 are assembled on the PCB 64 so as to electrically connect to each other. At this time, as discussed above, the end wires of the air-core coil 63 are bent at a side of the T-shaped core 62 to extend to the bottom surface of the flat base part 2*b* of the T-shaped core 62. After both ends of the conducting wire 4 are flattened, the flattened ends 5 are fixed on the bottom surface of the T-shaped core 62 as shown in FIG. 2. However, the present invention is not limited to the above configuration. The end wires of the air-core coil 63 are bent at a side of the PCB 64 to extend to a bottom surface of the PCB 64. After both ends of the conducting wire 4 are flattened, the flattened ends (similar to the flattened ends 5 shown in FIG. 2) are fixed to terminals or pads located on the bottom surface of the PCB 64.

Figure 7:
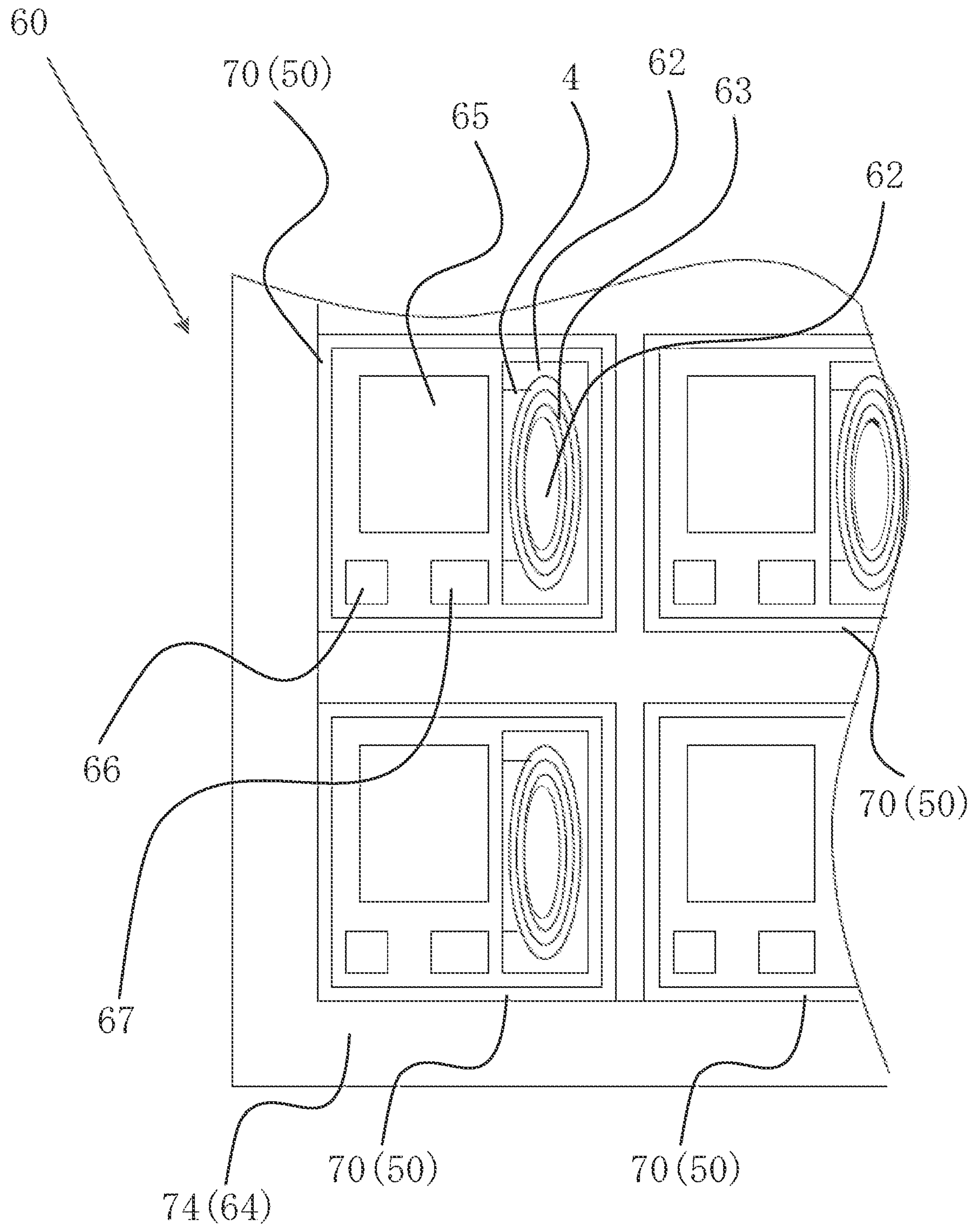
FIG. 7 is a sectional view that shows a PCB in which a plurality of power supply modules are formed according to an embodiment of the present invention.

FIG. 7 is a sectional view that shows a PCB 74 (64) in which a plurality of power supply modules are formed. In FIG. 7, the T-shaped core 62, the air-core coil 63, the IC 65, the resistor 66, the capacitor 67, and a metal mold 70 (50) are assembled on the PCB 74 (64). These components are repeatedly formed on the PCB 74 (64) as shown in FIG. 7.

Preparing Mixture

It is preferred that a mixture is prepared at nearly the time as preparing the PCB 64, assembling the IC 65, the resistor 66, the capacitors 67, the T-shaped core 62 and the air-core coil 63 to the PCB 64. It is preferred that the mixture is made of both magnetic and insulation materials as the T-shaped core 2 (62). Specifically, the magnetic material is Fe—Si alloy. Fe—Si alloy generally contains 3-97 wt % of Si and 3-97 wt % of Fe. Another metal, such as Cr, can be added. Fe—Si—Cr alloy is preferred as the metal magnetic material. More preferably, the metal magnetic material is Fe4Si4Cr. The insulation material is preferably a thermoplastic resin or a thermosetting resin, for example a silicone resin. Any resin that has a heat resistance property that tolerates the heat at the time of assembling and packaging an electronic component can be used. It is preferred that the insulation material is an epoxy resin. The mixture is formed by mixing the metal magnetic material and the insulation material. Therefore, the mixture may be referred to as metal paste. A mixing ratio of the Fe—Si—Cr alloy and the epoxy resin is preferably between 3 wt %:97 wt % and 97 wt %:3 wt %. It is preferred that the ratio of the Fe—Si—Cr alloy and the epoxy resin is 95 wt %:5 wt %. If an amount of the Fe—Si—Cr alloy exceeds 97 wt %, the final material strength is inferior. If an amount of the Fe—Si—Cr alloy decrease 3 wt %, the magnetic characteristics is inferior. The viscosity of the mixture is about 1,000 to 1,000,000 mPa·s at room temperature. A solvent can be used to adjust viscosity.

Injecting Mixture into Mold

FIG. 4 is a schematic view that shows a dispenser 40 that supplies the mixture 42 into the metal mold 50 (70) to embed the power supply module 60. FIG. 5 is a schematic view that shows a process for removing excessive mixture by the sharp edge 57 of the remover 56. The injecting mixture process for the power supply module 60 is the same as that of the inductor element 1 as discussed above and therefore a detailed explanation will be omitted here.

The dispenser 40 supplies the mixture to the metal mold 50 (70) shown in FIGS. 5 and 7 to embed the power supply module 60. The configurations and functions of the dispenser 40 are the same as above. Thus, detailed explanations are omitted here.

In FIG. 5, the PCB 64, electrodes 52, the air-core coil 3 (63), the T-shaped core 2 (64) are placed in the mold 50 (70).

As shown in Step 2 in FIG. 3, after the above components are placed in the mold 50 (70), the mixture is injected into the mold 50 (70) from the discharge opening 49 of the dispenser 40 and embeds the above components as shown in FIG. 5. In other words, the entire space in the mold 50 (70) is filled with the mixture 42. At this time, the mixture 42 to be injected has the following properties. A temperature of the mixture is in a range of 20 to 50 C°, and more preferably 25 C°. Because the volume of the mixture 42 decreases by later processes, the mixture 42 is injected over the opening of the mold 50 (70).

In the above discussions, the mixture 42 is stored in the material tank 41. However, the present invention is not limited to the above disclosure. The material tank 41 preferably stores only the metal magnetic material. The epoxy resin may be added in the cylinder 47 and mixed with the metal magnetic material by the mixer 46.

Heating Mixture at Low Temperature

As shown in Step 3 in FIG. 3, while the above components are placed in the mold 50 (70) as shown in FIGS. 5 and 7, a low temperature heating process is performed by a heater. The mold 50 (70) having the above components is transferred from the dispenser 40 to a heater (not shown). It is preferred that the low temperature for this heating process is in a range of 60 to 100 C°, and more preferably 80 C°. It is preferred that the process time is in a range of 5 to 120 minutes, and more preferably 60 minutes. The solvent in the mixture is evaporated by the low temperature heating process. The viscosity of the mixture 42 is slightly increased by the low temperature heating process. However, the mixture 42 is not fully hardened.

Since the solvent in the mixture 42 is evaporated, small cavities/spaces may be created in the mixture 42. The small cavities/spaces may cause undesirable influences with respect to the compactness and outer appearance of the inductor element 1. If a big cavity is created in the mixture 42, the magnetic flux around the big cavity is disordered. Further, magnetic saturation tends to occur. These problems can be solved by a subsequent process that is explained below.

A conveyer furnace or an infrared heater can be used for performing the above low temperature heating process. A small heater can be added to the dispenser 40. In this case, it is preferred to add the small heater close to the discharge opening 49. The small heater can evaporate the solvent while a smooth flow of the mixture 42 is maintained prior to the small heater. Because the small heater can evaporate a part of the solvent, the processing time for the low temperature heating process can be shortened. Further, productivity is improved.

Adjusting Outer Shape while Removing Excessive Mixture

As shown in Step 4 in FIG. 3, an outer shape of the mixture 42 is adjusted. In addition, excessive mixture 42 is removed. The mold 50 (70) having the above components is processed by the remover 56. The remover 56 may be referred to as a scraper. As shown in FIG. 5, the sharp edge 57 of the remover 56 is slid from the left hand side to the right hand side along a solid line while the above components are still inside the mold 50 (70). The sharp edge 57 of the remover 56 is slid along the top surface of the mixture with a preferred angle of 0 to 80 degrees with respect to a top surface of the mold 50. Further preferably, the angle is between 0 to 20 degrees. More preferably, the angle is 15 degrees. In this removing process, a pressure of 0.1 to 20.0 $kg/cm^2$ may be applied to the mixture to reduce or eliminate the cavities/spaces that are formed by the low temperature heating process as discussed above. It is more preferred that the pressure is in a range of 1 to 10 $kg/cm^2$.

However, the present invention is not limited to the above disclosure. The removing process above can be performed separately from the pressure applying process. Before or after the removing process for removing the excessive mixture 42, a pressure of 0.1 to 20.0 $kg/cm^2$ may be applied to the mixture 42 for adjusting an outer shape of the mixture 42 by a movable punch of a press machine.

Hardening Mixture

As shown in Step 5 in FIG. 3, the mixture 42 is hardened by another heater. The mold 50 (70) having the above components is transferred from the heater for the low temperature heating process to another heater for a high temperature heating process. Alternatively, a two stage heater may be used. The purpose of the high temperature heating process is for hardening the mixture 42 to have a stable state as a final product. It is preferred that the high temperature for this heating process is in a range of 120 to 200 C°, and more preferably 150 C°. It is preferred that the process time is in a range of 10 to 90 minutes, and more preferably 30 minutes. In the high temperature heating process, a state of the mixture 42 is changed from a half-dried solid state to a solid state. A conveyer furnace or an infrared heater can be used for performing the above high temperature heating process.

Polishing Outside Hardened Mixture

After a hardened mixture 42, i.e., a hardened power supply module 60, is removed from the mold 50 (70), the hardened power supply module 60 is placed in, for example, a centrifugal barrel polishing machine (not shown) to perform a polishing process. Flashes or burrs that are formed on the outside of the hardened mixture 42 (power supply module 60) are polished by the centrifugal barrel polishing machine. In the polishing process, lead terminals formed on the outside of the power supply module 60 are also polished by the centrifugal barrel polishing machine to improve electrical connectivity.

Figure 8:
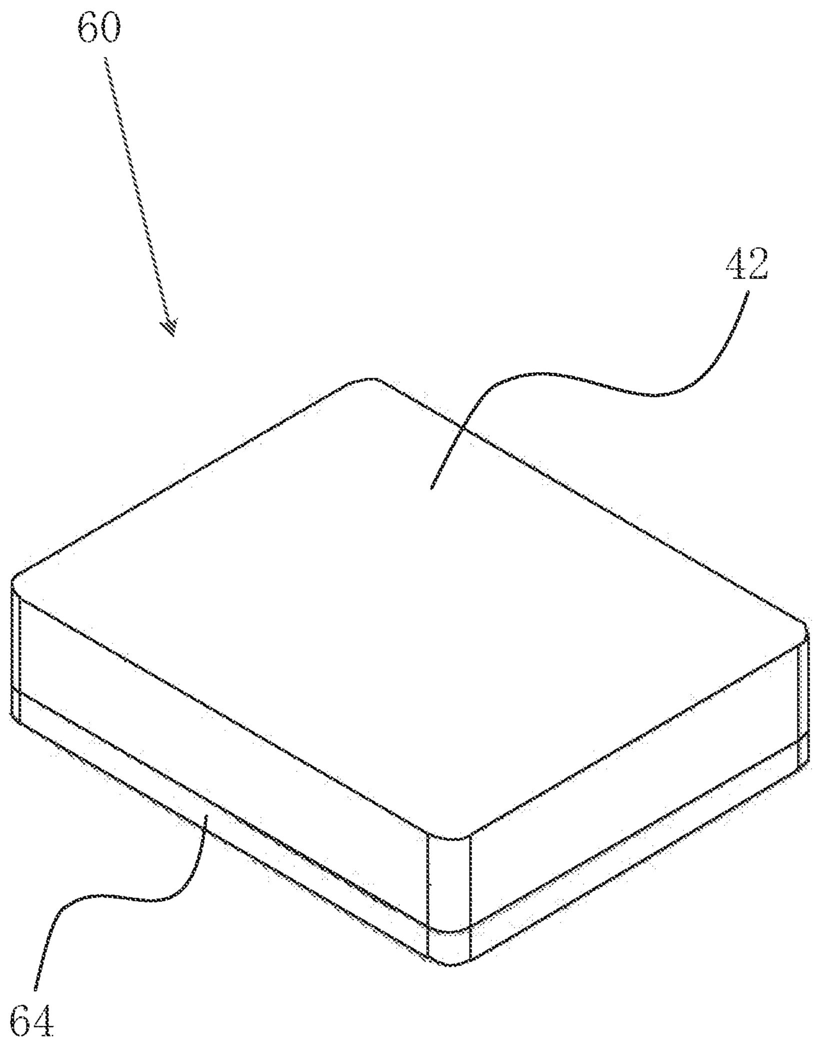
FIG. 8 is a schematic view of a power supply module as a final product according to an embodiment of the present invention.

FIG. 8 is a schematic view of the power supply module 60 as a final product. In FIG. 8, the power supply module 60 has the PCB 64 and the hardened mixture 42. The T-shaped core 62, the air-core coil 63, the IC 65, the resistor 66 and the capacitors 67 are embedded in the hardened mixture 42. In other words, areas around the T-shaped core 62, the air-core coil 63, the IC 65, the resistor 66 and the capacitors 67 are filled by the hardened mixture 42.

Third Embodiment

Figure 9:
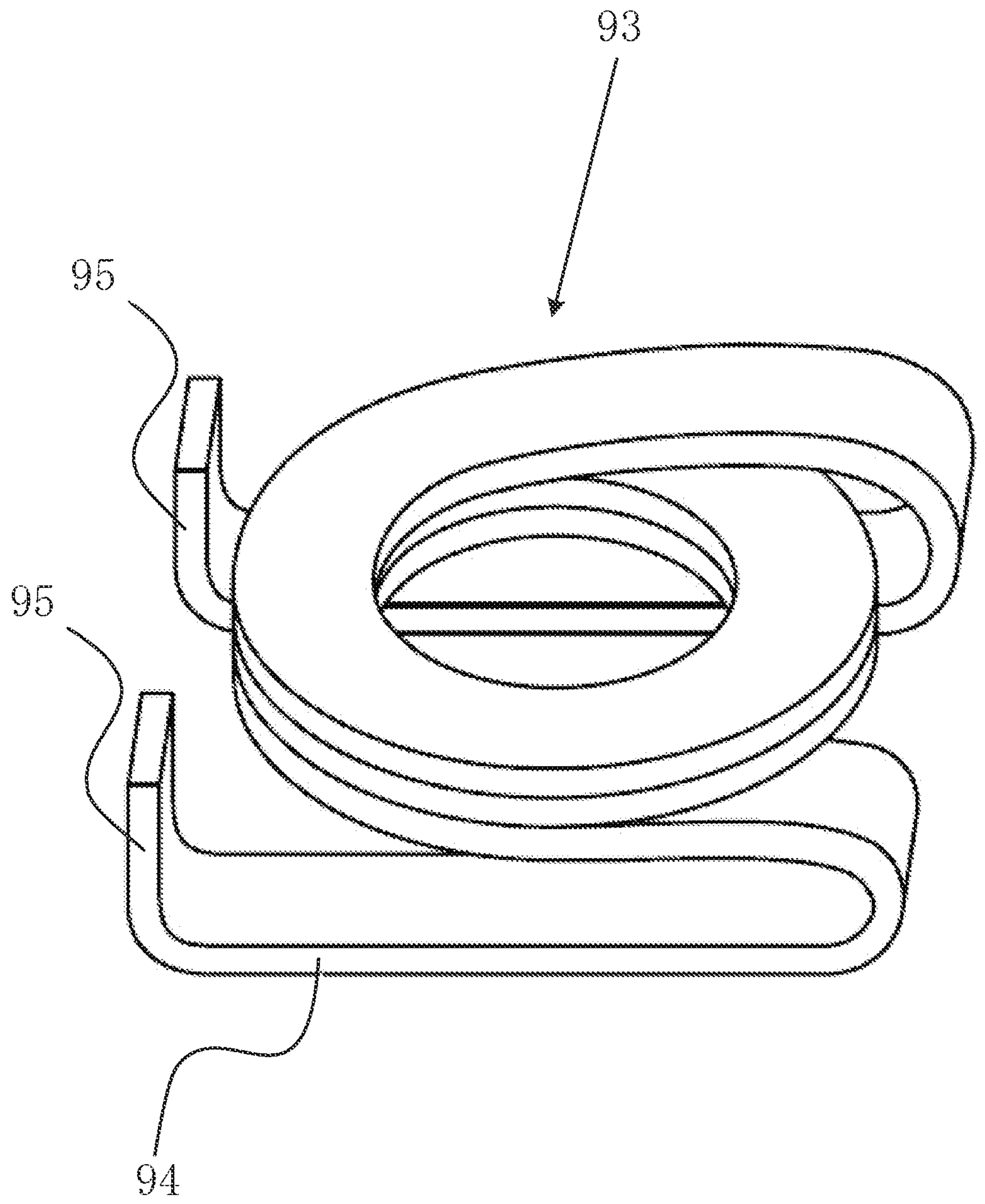
FIG. 9 is a schematic view that shows an air-core coil that is formed by a flat rectangular wire according to an embodiment of the present invention.
Figure 10:
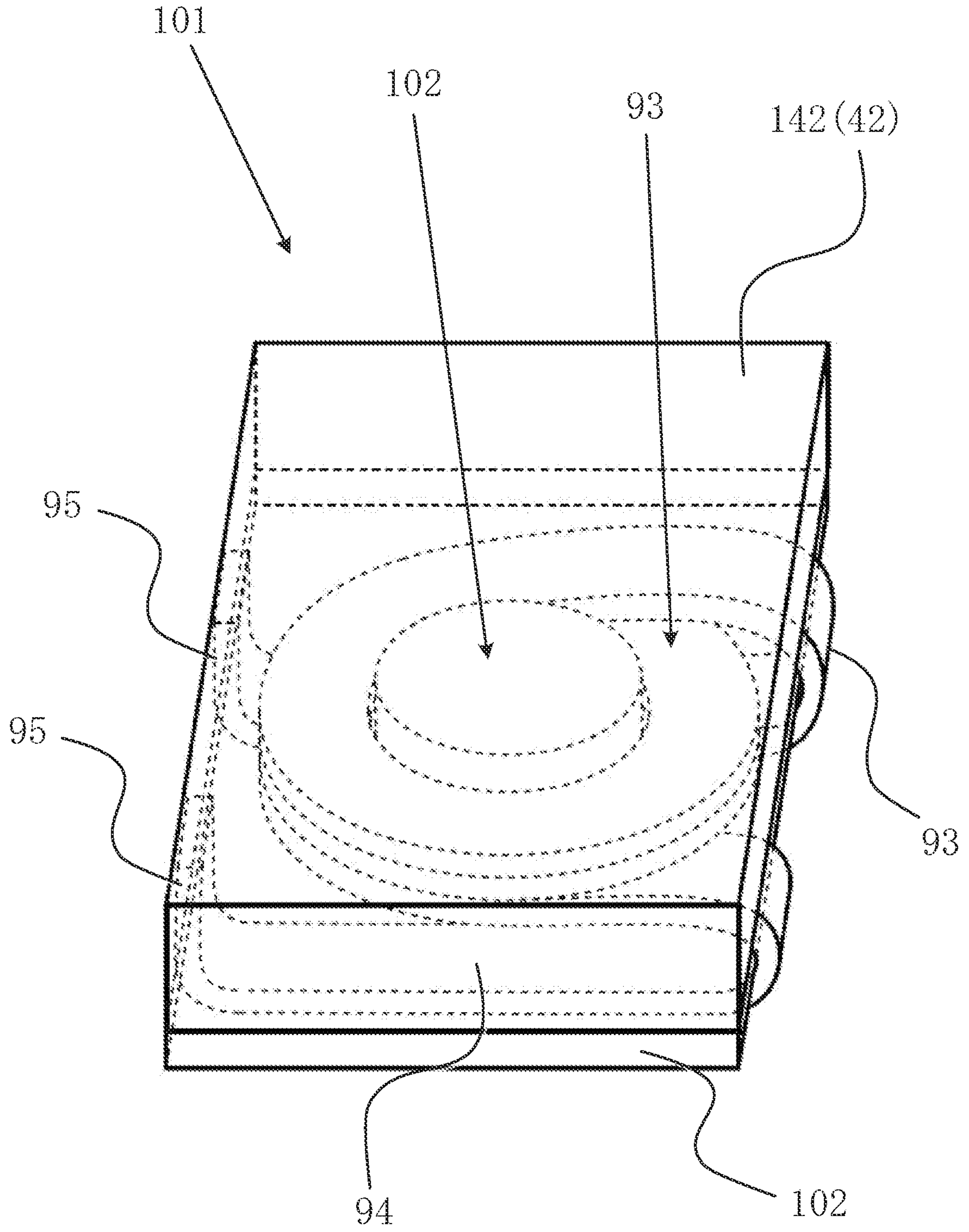
FIG. 10 is a schematic view that shows an inductor element as a final product that is configured with the coil shown in FIG. 9, a T-shaped core and a hardened mixture according to an embodiment of the present invention.

FIG. 9 is a schematic view that shows an air-core coil 93 that is formed by a flat rectangular wire 94. FIG. 10 is a schematic view that shows an inductor element 101 as a final product that is configured with the air-core coil 93 shown in FIG. 9, a T-shaped core 102 and a hardened mixture 142.

As shown in FIGS. 9 and 10, end wires 95 of the flat rectangular wire 94 are bent at one side of the T-shaped core 102 to extend through a bottom surface of the T-shaped core 102 to the other side of the T-shaped core 102. The end wires 95 of the flat rectangular wire 94 are bent at the other side of the T-shaped core 102 and stop at the other side.

The inductor element 101 is manufactured in the same manner as discussed above. Then, after the T-shaped core 102 and the air-core coil 93 are embedded by a mixture 142 of the composite magnetic material (e.g., a Fe—Si—Cr alloy) and an epoxy resin, the appropriate processes as discussed above are performed. As a result, the inductor element 101 as shown in FIG. 10 is completed. In FIG. 10, the mixture 142 is the hardened mixture.

Fourth Embodiment

Figure 11:
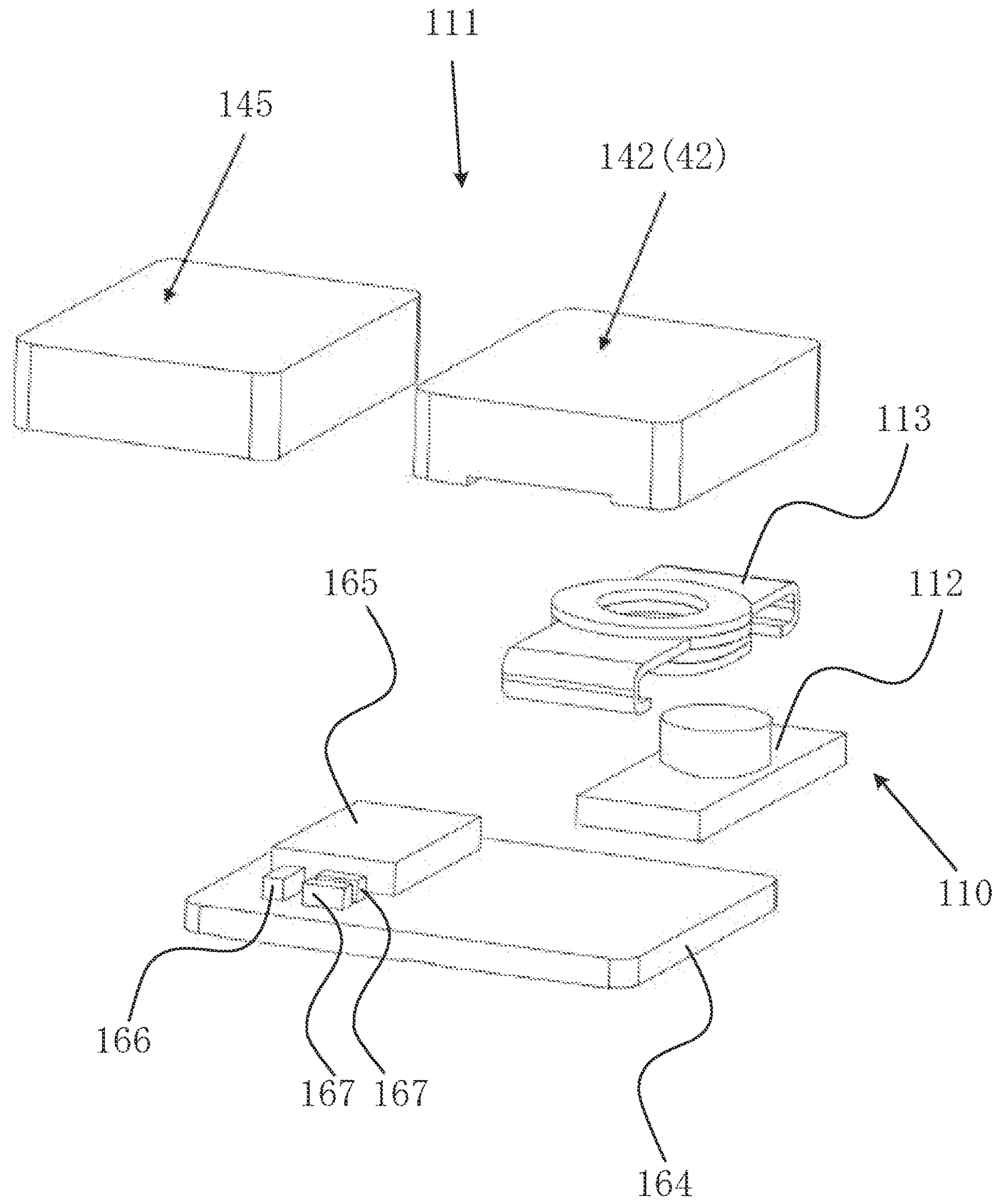
FIG. 11 is a schematic view of a power supply module according to yet another embodiment of the present invention.

FIG. 11 is a schematic view of a power supply module 111 according to a fourth embodiment of the present invention. The power supply module 111 is configured with an inductor element 110 including a T-shaped core 112 and an air-core coil 113, a mixture 142, a PCB 164, an IC 165, a resistor 166, capacitors 167, and a resin 145.

A difference from the previous embodiment is that two types of mixtures are used for the power supply module 111 shown in FIG. 11. Specifically, the mixture 142 is used for the inductor element 110 having the T-shaped core 112 and the air-core coil 113. The mixture is configured with the same material of the mixture 42 and is made by the same process as the mixture by using the dispenser 40 and other manufacturing equipment as discussed in the previous embodiments. Thus, detailed explanations are omitted here. Alternatively, a weight percent of a metal magnetic material can be increased for the mixture 142 because the higher magnetic mixture 142 is not placed around the IC 165 and passive components (the resistor 166 and the capacitors 167). In other words, because the IC 165 and the passive components 166, 167 are not influenced by magnetic flux from nearby magnetic materials, they function properly as designed.

The resin 145 is an insulating material made by a kind of resin or a mixture of several kinds of resin. In this embodiment, the resin 145 is made by an insulation resin by using a similar method as the mixture discussed above without including a metal magnetic material in the processes.

According to the fourth embodiment, a fairly large inductance can be generated in the inductor element 111 because the higher magnetic concentration mixture 142 can be used for embedding the inductor element 111 without undesirably influencing other components 165-167.

In the fourth embodiment, the mixture 142 for the inductor element 110 and the resin 145 for the IC 165, the resistor 166 and the capacitors 167 are used in different locations on the PCB 164. However, the following modification may be used. A mixture that is made of a metal magnetic material (e.g., a Fe—Si—Cr alloy) and an epoxy resin is injected on an entire area of a PCB within a mold. However, the mixture is not fully filled inside the mold. The mixture is filled until the mixture reaches about half the height of the mold. Thereafter, a resin of an insulating material is injected on the mixture until the resin is fully filled inside the mold. In other words, the mixture and the resin are stacked over an inductor element, an IC and passive components in this order. In this case, the mixture should be injected at least to cover a coil member of the inductor element to enhance an inductance property of the inductor element.

In the second and fourth embodiments discussed above, the T-shaped core 62 (112) is used. However, the second and fourth embodiments are not limited to this configuration. An I-shaped core can be used for the inductor element 61 shown in FIGS. 5-8 in the above embodiments. An I-shaped core is a cylindrical post-shaped core or a bar-shaped core.

Methods for manufacturing an electronic component that has a coil, such as the inductor element and power supply module, being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A method for manufacturing an inductor component comprising:

preparing a coil including a conductive material covered with an insulting layer, the coil having first and second ends;

removing the insulating layer from the first and second ends of the coil, and thereafter applying solder to the first and second ends of the coil;

assembling the coil onto a T-shaped core;

placing the T-shaped core with the coil assembled thereon into a mold;

putting a magnetic mixture into the mold and pressing the magnetic mixture so that the T-shaped core and the coil are embedded in the magnetic mixture, wherein the magnetic mixture contains an Fe—Si—Cr alloy magnetic powder, a resin, and a solvent, and wherein a viscosity of the magnetic mixture is 1,000 to 1,000,000 mPa·s at a room temperature; and heating the magnetic mixture in the mold at a predetermined temperature to harden the magnetic mixture.

2. The method for manufacturing the inductor component according to claim 1, wherein the predetermined temperature is in a range of 120 to 200° C., and a predetermined time of the heating of the magnetic mixture is in a range of 10 to 90 minutes.

3. The method for manufacturing the inductor component according to claim 2, further comprising:

pre-heating the magnetic mixture at a temperature of 60 to 100° C. before the heating of the magnetic mixture in the mold at the predetermined temperature.

4. The method for manufacturing the inductor component according to claim 1, wherein a pressure is applied to the magnetic mixture in the mold during the pressing with a pressure value in a range of 0.1 to 20.0 kg/cm$^2$.

5. The method for manufacturing the inductor component according to claim 4, wherein the pressure value is in a range of 1 to 10 kg/cm$^2$.

6. The method for manufacturing the inductor component according to claim 1, wherein the putting of the magnetic mixture into the mold is performed by an injection molding process.

7. The method for manufacturing the inductor component according to claim 1, further comprising:

removing an excessive amount of the magnetic mixture from a top surface of the magnetic mixture by sliding a sharp edge of a remover along the top surface while the T-shaped core and the coil remain in the mold.

8. The method for manufacturing the inductor component according to claim 7, wherein the sharp edge is slid with an angle with respect to the top surface, and the angle is in a range of 0 to 80 degrees.

9. The method for manufacturing the inductor component according to claim 1, wherein the Fe—Si—Cr alloy magnetic powder contains $Fe_4Si_4Cr$.

10. The method for manufacturing the inductor component according to claim 1, wherein a mixing ratio of the Fe—Si—Cr alloy magnetic powder and the resin is 95 wt %:5 wt %.

* * * * *